United States Patent [19]

Chan et al.

[11] Patent Number: 4,743,758
[45] Date of Patent: May 10, 1988

[54] LIGHT COLLECTOR FOR PHOTO-STIMULABLE PHOSPHOR IMAGING APPARATUS

[75] Inventors: Yali E. Chan; John C. Boutet; Robert W. Kulpinski, all of Rochester; Anthony R. Lubinsky, Webster; James F. Owen, Rochester, all of N.Y.

[73] Assignee: Eastman Kodak Company, Rochester, N.Y.

[21] Appl. No.: 917,935

[22] Filed: Oct. 14, 1986

[51] Int. Cl.⁴ ............................................. G01T 1/105
[52] U.S. Cl. ................................. 250/327.2; 250/228; 250/484.1
[58] Field of Search ................. 250/327.2, 484.1, 228; 350/174, 96.28; 356/431

[56] References Cited

U.S. PATENT DOCUMENTS

Re. 31,847  3/1985  Luckey ............................. 250/327.2
4,346,295  8/1982  Tanaka et al. .................... 250/327.2
4,616,129  10/1986  Yamada et al. .................... 250/207
4,680,473  7/1987  Matsuda et al. ................. 250/484.1

FOREIGN PATENT DOCUMENTS 0137674  8/1984  European Pat. Off. .
52-15216  4/1977  Japan .

OTHER PUBLICATIONS

Gerald F. Marshall, "Tapered Light Guide Condenser: a Design Approach," *Guided Wave Optical Systems & Devices II, Proc. SPIE*, vol. 176, pp. 161–217 (1979).
Dmetro Andrychuk, "A Multi-Image Optical System," Applied Optics, vol. 3, No. 8 (Aug. 1964), pp. 933–938.

*Primary Examiner*—Janice A. Howell
*Assistant Examiner*—Constantine Hannaher
*Attorney, Agent, or Firm*—Thomas H. Close

[57] ABSTRACT

A light collector for collecting and detecting emitted light from a raster scanned photo-stimulable phosphor sheet in photo-stimulable phosphor imaging apparatus includes a generally rectangular mirror box having two opposite open ends, one of the open ends being arranged along the scan line of the photo-stimulable phosphor, and a plurality of photomultiplier tubes being arranged at the other open end of the mirror box. An elongated mirror is arranged opposite the one open end of the mirror box for directing light emitted from the phosphor sheet into the mirror box.

10 Claims, 5 Drawing Sheets

LIGHT COLLECTOR FOR PHOTO-STIMULABLE PHOSPHOR IMAGING APPARATUS

TECHNICAL FIELD

The invention relates to apparatus for reading out the image stored in a photo-stimulable phosphor image recording medium, and more particularly to apparatus for collecting and detecting the radiation emitted from the photo-stimulable phosphor in response to interrogation by stimulating radiation.

BACKGROUND ART

In a photo-stimulable phosphor imaging system, as described in U.S. Pat. No. Re. 31,847 reissued Mar. 12, 1985 to Luckey, a photo-stimulable phosphor sheet is exposed to an imagewise pattern of short wavelength radiation, such as x-radiation, to record a latent image pattern in the photo-stimulable phosphor sheet. The latent image is read out by stimulating the phosphor with a relatively long wavelength stimulating radiation such as red or infrared light. Upon stimulation, the photo-stimulable phosphor releases emitted radiation of an intermediate wavelength such as blue or violet light in proportion to the quantity of short wavelength radiation that was received. To produce a signal useful in electronic image processing, the photo-stimulable phosphor sheet is scanned in a raster pattern by a beam of light produced for example by a laser deflecting by an oscillating or rotating scanning mirror and the emitted radiation is sensed by a photodetector such as a photomultiplier tube to produce the electronic image signal.

In one type of scanning apparatus, the photo-stimulable phosphor sheet is placed on a translation stage and is translated in a page scan direction past a laser beam that is repeatedly deflected in a line scan direction to form the scanning raster.

To optimize the signal-to-noise ratio (S/N) of the imaging system, it is desirable to collect as much of the emitted light as possible and to direct it to the photodetector. While the apparatus employed to collect the light may take various forms, one form of light collector is proposed in U.S. Pat. No. 4,346,295, issued Aug. 24, 1982, to Tanaka et al. The light collector proposed by Tanaka et al comprises a sheet of light transmitting material that is flat on one end, and rolled into an annular shape on the opposite end. The flat end of the light collector is positioned adjacent the scan line on the photo-stimulable phosphor sheet. The light receiving face of a photomultiplier tube is placed against the annular end of the light collector.

Light emitted from the phosphor sheet enters the flat end of the light collector and is light piped to the photomultiplier tube. Improved light collection efficiencies are achieved by having two such light collectors, one on each side of the scan line, or by placing a long narrow reflector opposite the flat end of the light collector to increase the collection window of the light collector. The transparent light collector has the drawback that it is inherently complicated to manufacture. Furthermore, the collection efficiency of transparent light guides is limited due to their absorption in the wavelength range of light emitted by the photo-stimulable phosphor sheet (e.g. blue-violet).

Experiments have identified another factor that limits the signal-to-noise ratio achievable with the photo-stimulable phosphor imaging apparatus. As the photo-stimulable phosphor sheet is scanned by the stimulating radiation beam, a high percentage (up to 90%) of the stimulating radiation is reflected from the photo-stimulable phosphor. If this reflected stimulating radiation is further reflected back on to the surface of the photo-stimulable phosphor (it is then called "flare") in a location away from the instantaneous scanning point the phosphor will be stimulated to emit in these other locations. When this flare induced emission of light is collected by the light collector it is called prestimulation and results in a spurious background signal. Such reflection of the stimulating radiation onto the photo-stimulable phosphor may occur from the light collecting edge of the light guide described above. Examples of the image degradation caused by prestimulation include a reduction in the contrast of images due to flare induced emission from high exposure areas. This adds unwanted signal to low exposure areas. Shadow artifacts are produced in the image when a high exposure object on a low exposure background field is scanned. The signal-to-noise ratio in all image areas is degraded. Laser noise is enhanced since a large area of the phosphor is exposed to a low level of stimulating radiation, the light emitted from this area will follow the fluctuations in laser power, thereby amplifying the effect of the laser noise.

It is therefore the object of the present invention to provide a light collector having improved collection efficiency and one that is easy to manufacture. It is a further object of the present invention to provide an improved light collector having reduced prestimulation. A desirable feature of such a light collector is that the collection efficiency versus scan position across a scan line be uniform. It is therefore a further object of the present invention to provide a light collector having a uniform collection efficiency across a scan line.

DISCLOSURE OF THE INVENTION

The objects of the present invention are achieved by providing a light collector having a generally rectangular mirror box with relatively wide plane mirrors on the top and bottom, relatively narrower mirrors on two opposite sides, and two opposite open ends. One of the open ends is arranged adjacent the scan line of the photo-stimulable phosphor sheet, and a plurality of photomultiplier tubes are arranged at the other open end of the mirror box. An elongated reflector is arranged opposite the one open end of the mirror box for directing light emitted from the phosphor into the open end of the mirror box.

MODES OF CARRYING OUT THE INVENTION

Figure 1:
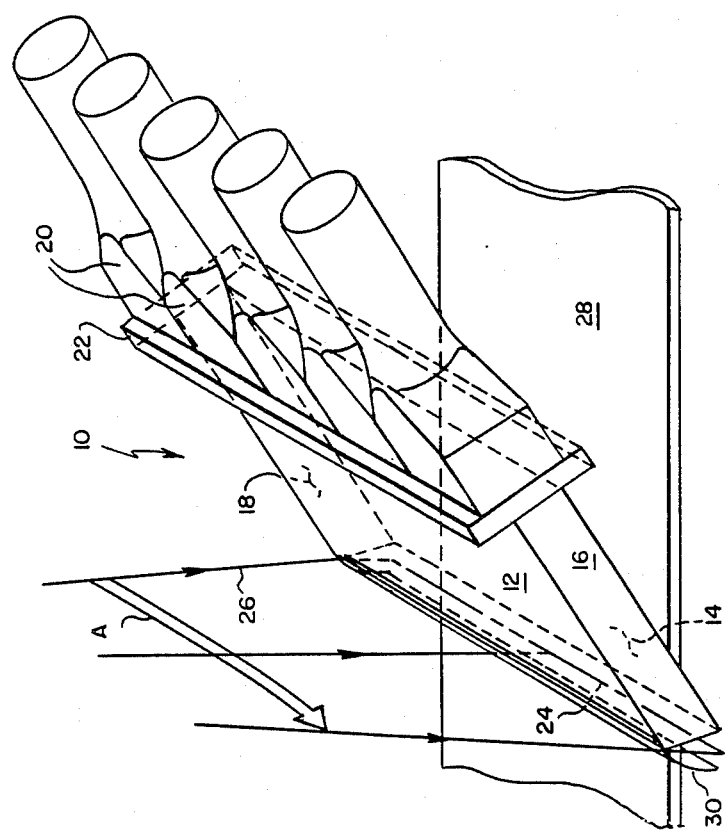
FIG. 1 is a perspective view of a light collector according to the present invention.

Turning now to FIG. 1, a light collector according to the present invention will be described. The light collector includes a generally rectangular mirror box 10, having relatively wide top and bottom mirrors 12 and 14, and relatively narrow side mirrors 16 and 18. At one end of the mirror box are a row of photomultiplier tubes 20. The photomultiplier tubes 20 are provided with rectangular light receiving faces so that they can be efficiently stacked along the end of the mirror box. A filter 22, which transmits at the wavelength of light emitted from a photo-stimulable phosphor sheet and does not transmit at the wavelength employed for stimulating the phosphor sheet, is located between the light receiving faces of the photomultiplier tubes and the mirror box. The open end of the mirror box opposite the photomultiplier tubes extends along the scan line 24 of a laser beam 26 that is deflected in the direction of arrow A to scan the photo-stimulable phosphor sheet 28.

An elongated reflector 30 is positioned opposite the open end of the mirror box 10 to reflect emitted light into the mirror box.

Figure 2:
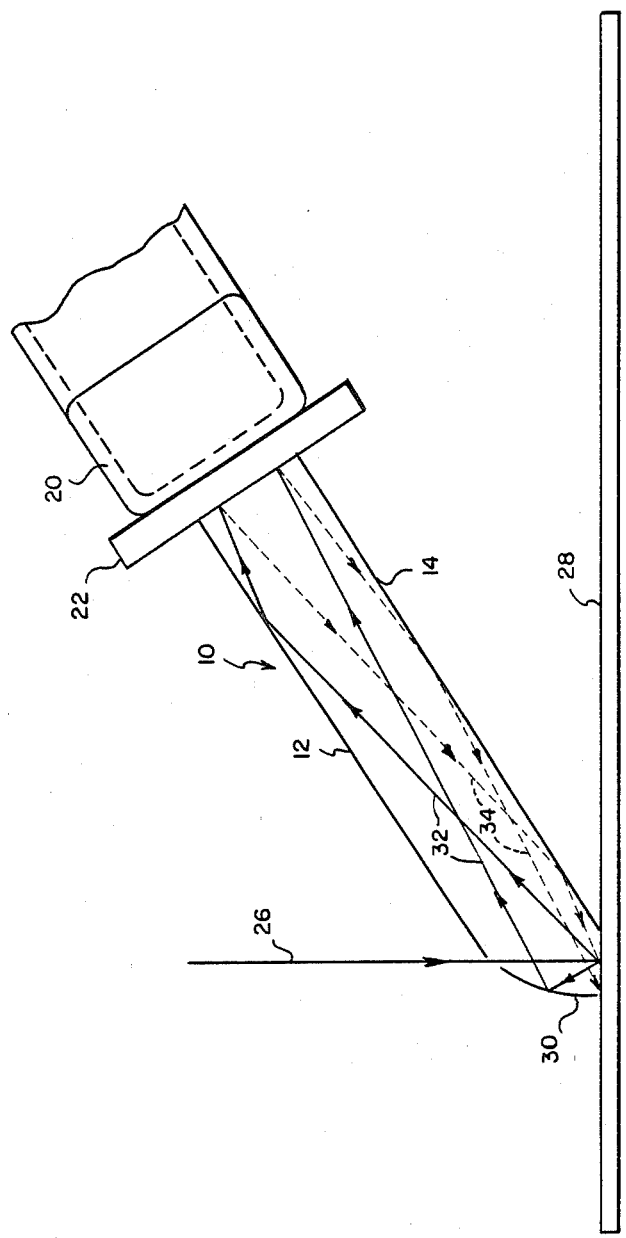
FIG. 2 is a side view of the light collector shown in FIG. 1.

FIG. 2 is a cross-sectional view of the light collector shown in FIG. 1. As shown in FIG. 2, some of the stimulating radiation from scanning beam 26, as indicated by rays 32, is reflected from the surface of the phosphor sheet 28 and enters the mirror box 10. Most of the stimulating radiation is absorbed by the filter 22, but some is reflected as indicated by phantom rays 34 back onto the surface of the photo-stimulable phosphor. These rays reflected off the surface of the filter 22 can be a cause of prestimulation in this light collector.

Figure 3:
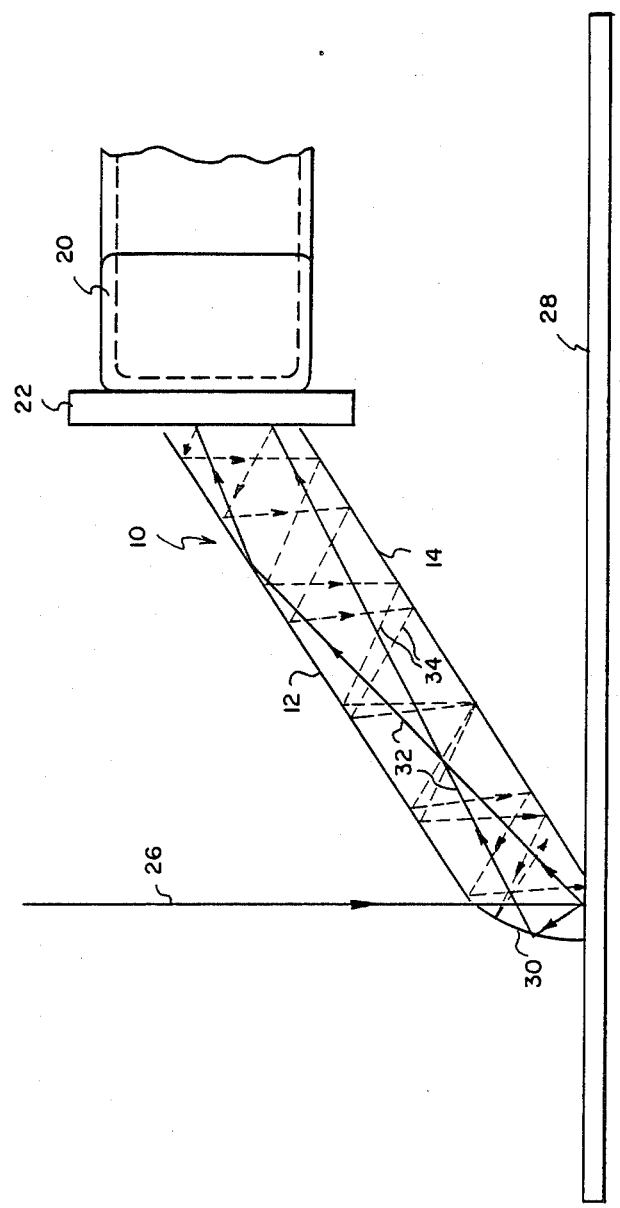
FIG. 3 is a side view of a light collector similar to that shown in FIG. 1 showing further improvements.

In an improvement to further reduce prestimulation, the faces of the photomultiplier tube are arranged at an oblique angle with respect to the end of the mirror box as shown in FIG. 3. As a result, the rays 32 which directly reach the face of the infrared filter 22 are subject to multiple reflections (as shown by phantoms rays 34 in FIG. 3) on the return trip. Due to the multiple reflections, most of the energy in the rays is dissipated by the time they reach the phosphor sheet.

Figure 4:
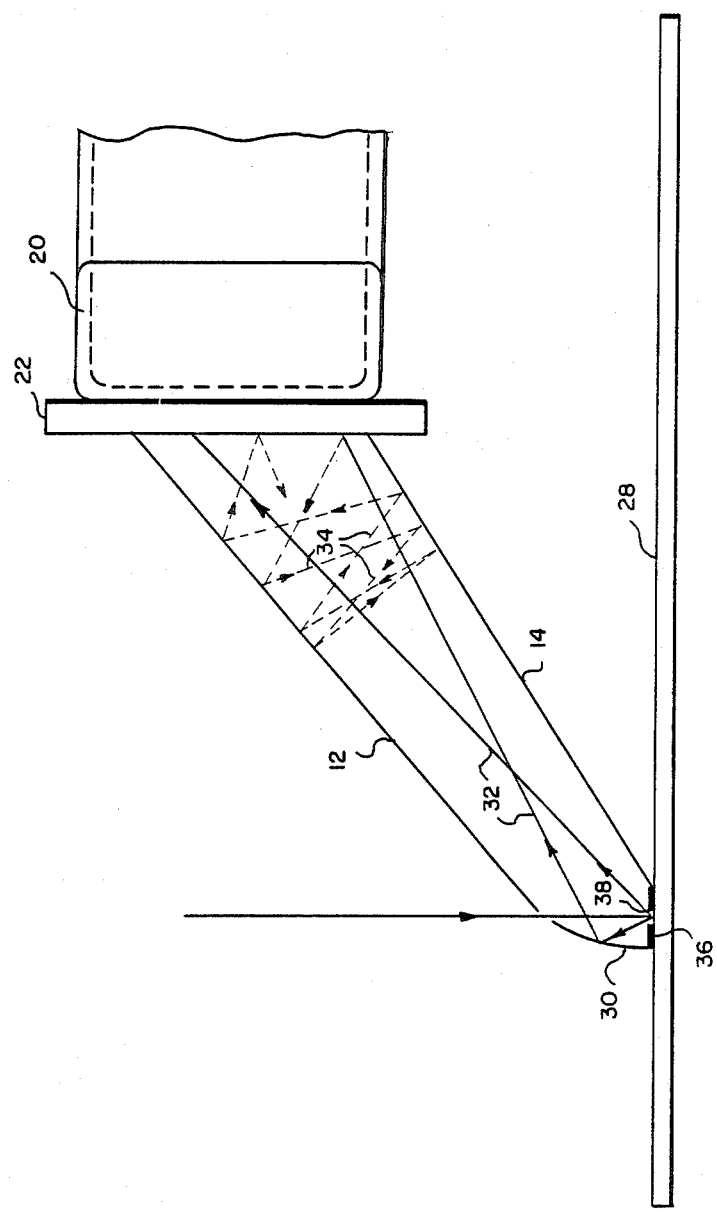
FIG. 4 is a side view of a light collector similar to that shown in FIG. 2 showing further improvements.
Figure 5:
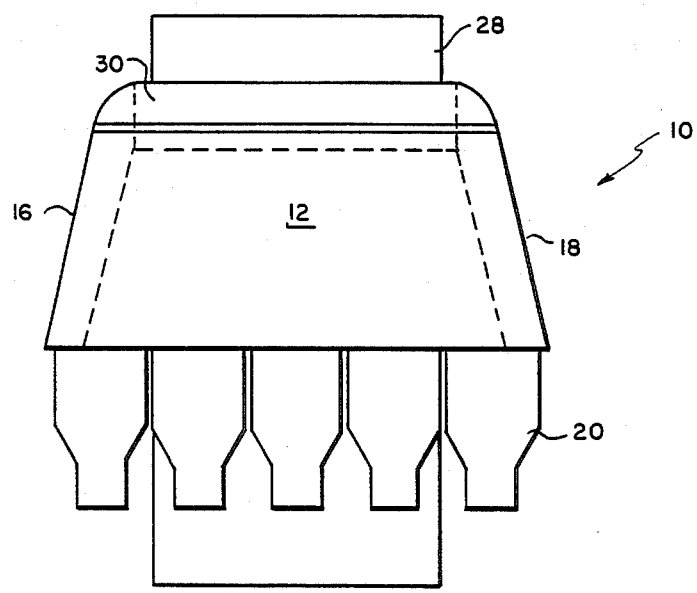
FIG. 5 is a top view of a light collector similar to that shown in FIG. 2, illustrating a further improvement.

To further increase the light collection efficiency and reduce prestimulation, the top and bottom mirrors 12 and 14 are angled with respect to each other so that the end of the mirror box near the photomultiplier tubes is wider than the end near the photo-stimulable phosphor sheet as shown in FIG. 4. Similarly, the side mirrors 16 and 18 may be angled with respect to each other with their wide ends near the photodetectors, to further increase collection efficiency and reduce prestimulation. FIG. 5 is a top view of a light collector having angled side mirrors. As a result, a greater percentage of the emitted light reaches the photomultiplier tube with fewer reflections, and stimulating light that reaches the infrared filter 22 directly (as shown by rays 32 in FIG. 4) and is reflected from the surface of the infrared filter (as shown by phantom rays 34 in FIG. 4) is trapped.

Prestimulation may be further reduced by providing a mask 36 as shown in FIG. 4 extending between the bottom edge of mirror 30 and the bottom mirror 14 of the mirror box. The mask 36 defines a slot 38 through which the scanning beam passes to the surface of the photo-stimulable phosphor 28, and which allows the emitted light to enter the collector. Prestimulation may be further reduced by applying an antireflection coating to the surface of filter 22.

A light collector according to the present invention was constructed using diamond machined aluminum plates for the mirrors. The diamond machined mirror surfaces were 90% reflective for the emitted wavelength of 400 nm. The mirror box was 43 cm wide by 10 cm long. The height of the mirror box at the small end was 2.29 cm, and the height at the large end was adjustable. Five 4×8.8 cm rectangular faced photomultiplier tubes were mounted at the wide end of the mirror box with their faces perpendicular to the plane of the phosphor sheet and at an angle of 56° to the top adjustable mirror. An elliptical cross section reflector 30 was employed, having one focal point at the scan line and the other near the detector face. It is noted that the shape of reflector 30 is not critical and, other shapes such as circular cross sections could be employed.

The light collector was used in a photo-stimulable phosphor imaging apparatus, and found to have high collection efficiency, low prestimulation and response that was readily made uniform across a scan line by adjusting the individual gains of the photomultiplier tubes. Although the mirrors were made of metal, optical glass plates with reflective coatings may also be used.

INDUSTRIAL APPLICABILITY AND ADVANTAGES

The light collector according to the present invention is useful in photo-stimulable phosphor imaging apparatus used for example in x-radiography. The light collector has the advantages that it is easily constructed, has high light collection efficiency, low prestimulation, and uniform collection efficiency across a scan line.

We claim:

1. A light collector for collecting and detecting emitted light from a raster scanned photo-stimulable phosphor sheet in a photo-stimulable phosphor image apparatus is characterized by:
   a generally rectangular mirror box having relatively wide plane mirrors on the top and bottom, relatively narrower mirrors on the two opposite sides, and two opposite open ends, one of said open ends being arranged adjacent the scan line on the photostimulable phosphor sheet;
   a plurality of photomultiplier tubes having light receiving faces arranged at the other open end of the mirror box; and
   an elongated mirror arranged opposite said one open end of said mirror box for directing light emitted from said phosphor sheet into the open end of said mirror box.

2. The light collector claimed in claim 1, wherein said elongated mirror has an elliptical cross section with one focus of said ellipse coinciding with said scan line, and the other near the light receiving faces of said photomultiplier tubes.

3. The light collector claimed in claim 1, wherein said top and bottom mirrors are spaced farther apart at the open end adjacent the photomultiplier tubes than at the open end adjacent the scan line.

4. The light collector claimed in claim 1, wherein said side mirrors are spaced farther apart at the open end adjacent the photomultiplier tubes than at the open end adjacent the scan line.

5. The light collector claimed in claim 1, wherein said mirrors are diamond machined aluminum plates.

6. The light collector claimed in claim 1, wherein the light receiving faces of the photomultiplier tubes are positioned at an oblique angle at the end of the mirror box.

7. The light collector claimed in claim 1, further including a mask extending from the edge of the bottom mirror of said light box to the bottom edge of the elongated mirror, said mask defining a slot for passing a scanning beam to the photo-stimulable phosphor sheet and for allowing emitted light to enter the light collector.

8. The light collector claimed in claim 1, wherein said mirrors are coated glass plates.

9. The light collector claimed in claim 1, including a filter for absorbing stimulating wavelengths of light and passing light emitted from the phosphor sheet, between said other open end of the mirror box and the light receiving faces of the photomultiplier tubes.

10. The light collector claimed in claim 9, wherein said filter includes an antireflection coating.

* * * * *